(12) United States Patent
Restivo et al.

(10) Patent No.: US 10,989,348 B2
(45) Date of Patent: Apr. 27, 2021

(54) SYSTEM FOR AND METHOD OF SEALING A FLOWLINE WITH A METAL SEAL AFTER HOT TAPPING

(71) Applicant: Oceaneering International, Inc., Houston, TX (US)

(72) Inventors: Andrew Gregory Restivo, Cypress, TX (US); Norman Gregory Smith, Houston, TX (US)

(73) Assignee: Oceaneering International, Inc., Houston, TX (US)

( * ) Notice: Subject to any disclaimer, the term of this patent is extended or adjusted under 35 U.S.C. 154(b) by 0 days.

(21) Appl. No.: 15/693,359

(22) Filed: Aug. 31, 2017

(65) Prior Publication Data

US 2018/0058621 A1 Mar. 1, 2018

Related U.S. Application Data

(60) Provisional application No. 62/382,683, filed on Sep. 1, 2016.

(51) Int. Cl.
  *F16L 55/179* (2006.01)
  *F16L 41/06* (2006.01)
  *F16L 55/18* (2006.01)

(52) U.S. Cl.
  CPC .......... *F16L 55/179* (2013.01); *F16L 41/06* (2013.01); *F16L 55/18* (2013.01); *Y10T 137/0469* (2015.04); *Y10T 137/6123* (2015.04)

(58) Field of Classification Search
  CPC ......... F16L 41/06; F16L 41/04; F16L 41/045; F16L 41/065; F16L 55/18; F16L 1/26; F16L 1/265; Y10T 137/6123; Y10T 137/612; Y10T 137/0458; Y10T 137/0469
  See application file for complete search history.

(56) References Cited

U.S. PATENT DOCUMENTS

| | | | | |
|---|---|---|---|---|
| 2,151,594 A | * | 3/1939 | Grantham | F16L 41/06 137/318 |
| 3,068,726 A | * | 12/1962 | Ver Nooy Burton | F16L 41/04 137/318 |
| 3,508,410 A | * | 4/1970 | Lynch | F16L 1/26 405/188 |
| 3,737,180 A | * | 6/1973 | Hayes, Jr. | F16L 41/06 138/99 |
| 3,827,448 A | * | 8/1974 | Alba | F16L 1/26 137/15.11 |
| 4,127,141 A | * | 11/1978 | Ledonne | F16L 55/124 137/15.15 |
| 4,431,017 A | * | 2/1984 | Willemsen | F16L 41/06 137/15.14 |

(Continued)

*Primary Examiner* — David Colon-Morales
(74) *Attorney, Agent, or Firm* — Maze IP Law, P.C.

(57) ABSTRACT

In embodiments, a hot tap clamping system comprises a clamp which fits over and secures against a pipe, an actuator interface, an actuator operatively in communication with clamp, and a hot tap assembly. In a further embodiment, a system for sealing a flowline with a metal seal after hot tapping comprises a sealer, a hot tap drill/plug running tool, and a metal seal plug which is typically configured for use in sealing a flowline, e.g. a pipe, with a metal seal after hot tapping where the metal plug seal is inserted into the pipe and engages with and seals as a hot tap.

9 Claims, 11 Drawing Sheets

(56) References Cited

U.S. PATENT DOCUMENTS

| | | | | |
|---|---|---|---|---|
| 4,443,129 A * | 4/1984 | de Sivry | B63C 11/40 | 405/168.1 |
| 4,535,822 A * | 8/1985 | Rogers, Jr. | F16L 55/17 | 138/99 |
| 5,205,732 A * | 4/1993 | Kirby | B29C 61/00 | 432/225 |
| 5,577,535 A * | 11/1996 | Motta | F16L 1/26 | 138/97 |
| 5,593,249 A * | 1/1997 | Cox | E21B 41/04 | 405/169 |
| 6,200,068 B1 * | 3/2001 | Bath | F16L 1/26 | 134/167 C |
| 6,290,431 B1 * | 9/2001 | Exley | F16L 1/26 | 137/317 |
| 6,290,432 B1 * | 9/2001 | Exley | B08B 9/023 | 137/317 |
| 6,551,034 B1 * | 4/2003 | Nyhuis | F16L 41/04 | 137/318 |
| 6,640,827 B1 * | 11/2003 | McClure | F16L 41/06 | 137/318 |
| 6,691,733 B1 * | 2/2004 | Morris | F16L 41/16 | 137/317 |
| 7,082,960 B2 * | 8/2006 | Kim | F16L 41/06 | 137/318 |
| 7,252,459 B2 * | 8/2007 | Bideault | F16L 41/06 | 405/184.1 |
| 7,325,559 B2 * | 2/2008 | Darut | F16L 41/06 | 137/15.12 |
| 7,722,298 B2 * | 5/2010 | Russell | F16L 41/06 | 137/318 |
| 7,901,162 B2 * | 3/2011 | German | F16L 41/04 | 408/1 R |
| 8,069,874 B2 * | 12/2011 | Overstreet | F16L 41/06 | 137/318 |
| 8,333,211 B2 * | 12/2012 | McGraw | E21B 29/12 | 137/15.12 |
| 8,511,328 B2 * | 8/2013 | Lillejordet | E21B 43/013 | 137/15.12 |
| 8,534,306 B2 * | 9/2013 | Ayers | F16L 41/06 | 137/15.14 |
| 8,701,699 B2 * | 4/2014 | Cenac | E21B 29/00 | 137/317 |
| 9,004,813 B2 * | 4/2015 | Al-Buraik | F17D 5/02 | 405/158 |
| 9,200,740 B2 * | 12/2015 | Leto | F16L 41/06 | |
| 9,404,613 B2 * | 8/2016 | Bowie | F16L 41/06 | |
| 9,759,366 B2 * | 9/2017 | Long | F16L 55/18 | |
| 2008/0196769 A1 * | 8/2008 | Overstreet | F16L 41/06 | 137/318 |
| 2008/0260466 A1 * | 10/2008 | Stone | F16L 41/06 | 405/184.1 |
| 2009/0229681 A1 * | 9/2009 | Ahlen | F16L 41/06 | 137/317 |

* cited by examiner

SYSTEM FOR AND METHOD OF SEALING A FLOWLINE WITH A METAL SEAL AFTER HOT TAPPING

RELATION TO PRIOR APPLICATIONS

This application claims priority from and through U.S. Application 62/382,683 titled "Modular Subsea Installation and Workover Control System" and filed on Aug. 12, 2016.

BACKGROUND OF THE INVENTION

Pipes and other flowlines, especially subsea, often require a hot tap. Hot tapping is a method of making a connection to a pipeline while the pipe remains pressurized in such a way as to prevent interruption to the normal flow or operation of the pipeline, and has been carried out extensively subsea for a long time.

Hot tapping has traditionally been carried out manually by divers, although some automatic systems have been used in the past. However, diver based systems are not possible at deeper water depths outside the range of divers. Further, current diver and land-based hot tap methods can contain metal sealing but this metal sealing is not at the tap, taking place instead at a flange of a clamp or at a tee. Moreover, most current hot tap seals are annular and operate as an annulus isolation seal whose compression is energized by a wellhead compression preload.

FIGURES

The figures supplied herein illustrate various embodiments of the invention.

DESCRIPTION OF EXEMPLARY EMBODIMENTS

Generally, all embodiments of the hot tap clamping systems described herein are operable by a remotely operated vehicle (ROV).

Figure 1:
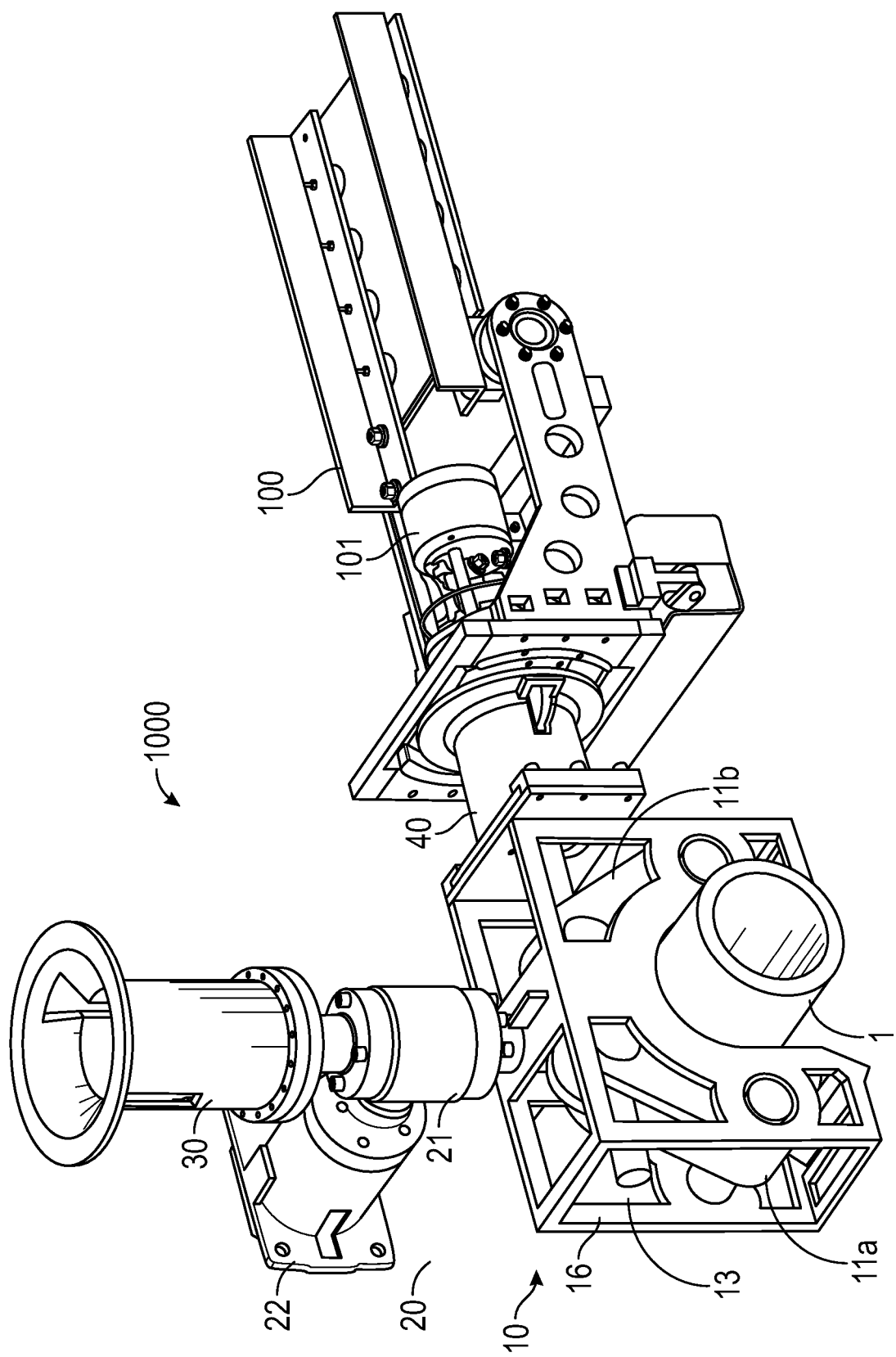
FIG. 1 is a view in partial perspective of an exemplary embodiment of a hot tap clamping system.

Referring now generally to FIG. 1, in a first embodiment hot tap clamping system 1000 comprises clamp 10, hot tap assembly 20, hot tap interface 30 operatively connected to and in fluid communication with valve 21, and support 100 operatively connected to actuator interface 40. Support 100 is generally ROV compatible.

Figure 2:
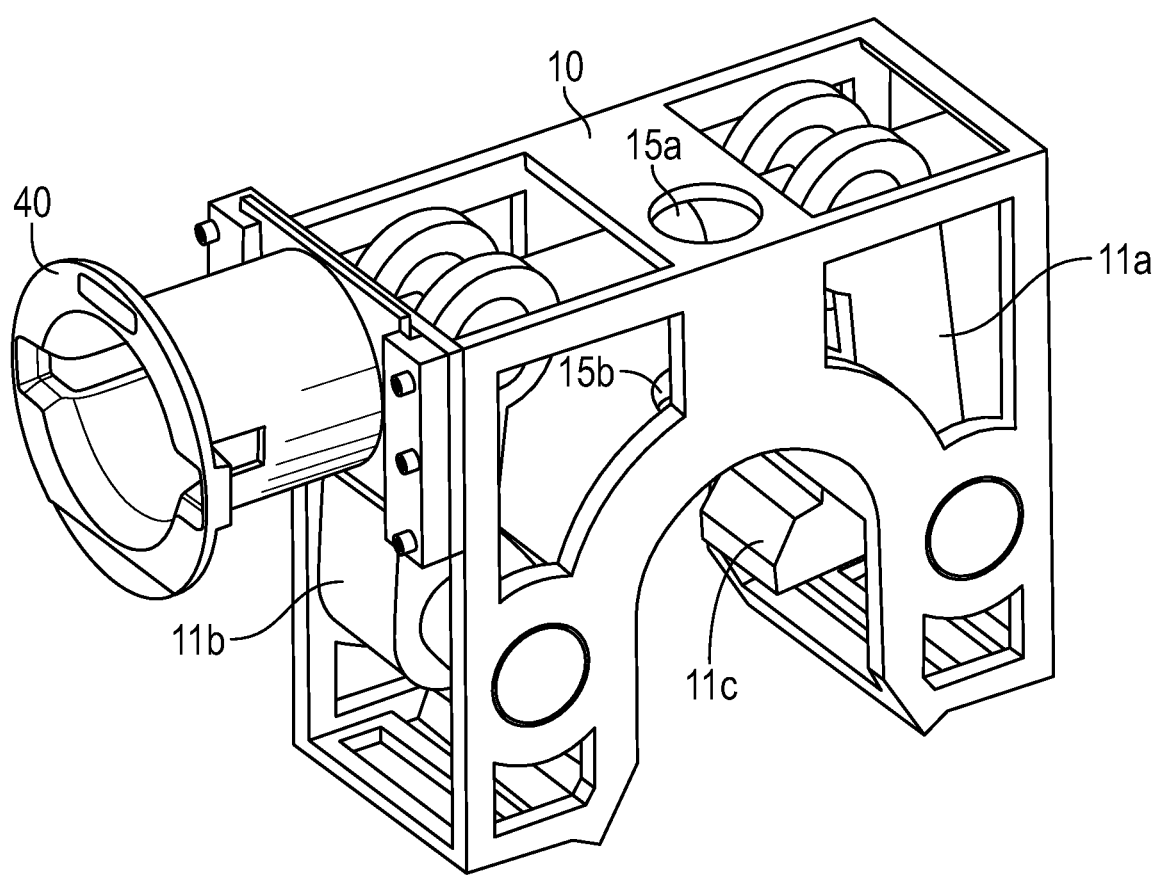
FIG. 2 is a view in partial perspective of a clamp of the exemplary embodiment of a hot tap clamping system of FIG. 1.

Referring additionally to FIG. 2, in embodiments clamp 10 comprises housing 16 sized to fit over pipe 1, where housing 16 comprises one or more ports 15a,15b sized to allow insertion of a hot tap therethrough and movable gripper 11 displaced at least partially within housing 16. In certain embodiments, movable gripper 11 comprises movable gripper arms 11a,11b which are movable between a first position which allows positioning of housing 16 about a predetermined portion of pipe 1 and a second position which secures clamp 10 against pipe 1. Typically, at least one portion of movable gripper 11, e.g. an end portion one or both movable gripper arms 11a,11b, comprises gripper latch 11c.

Referring back to FIG. 1, in certain embodiments one or more actuator interfaces 40 are typically present and operatively connected to movable gripper 11 such as via actuator 13 which is also operatively in communication with one or both movable gripper arms 11a,11b.

Figure 3:
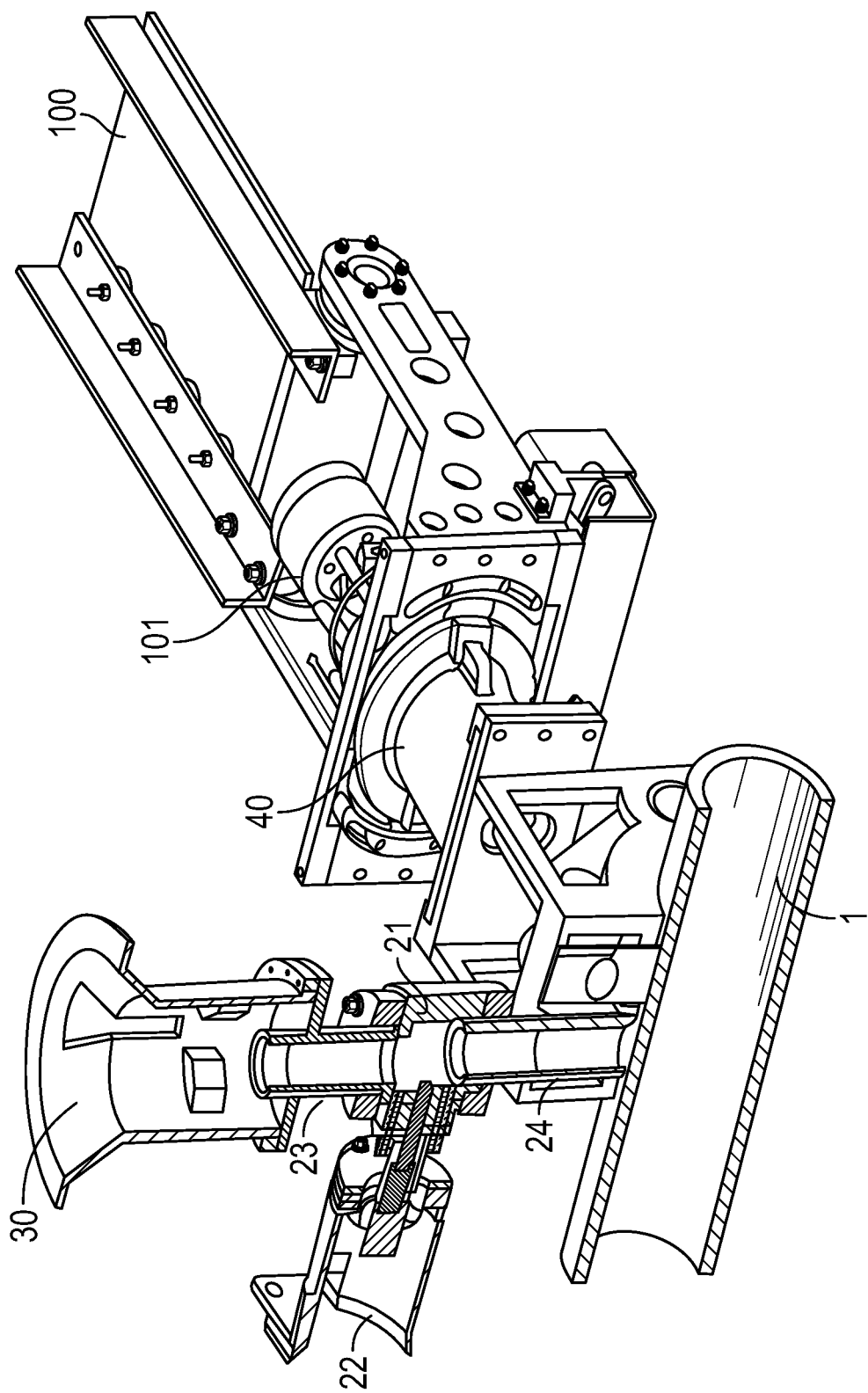
FIG. 3 is a cutaway view in partial perspective of the exemplary embodiment of a hot tap clamping system of FIG. 1.
Figure 4A:
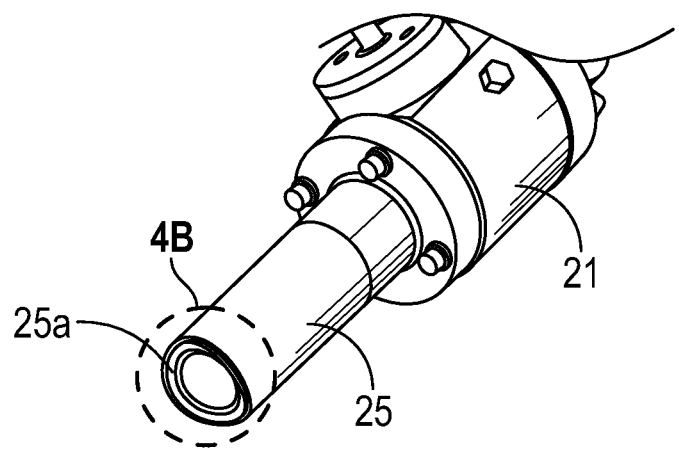
FIGS. 4A and 4B are views of a portion of a valve and a seal of the exemplary embodiment of a hot tap clamping system of FIG. 1.
Figure 4B:
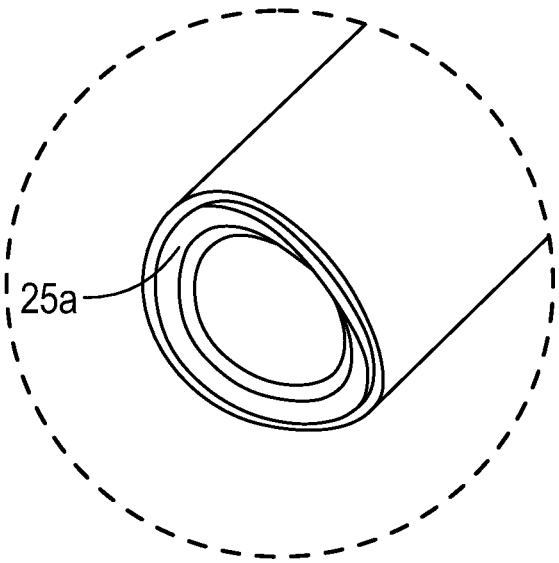

Referring additionally to FIG. 3, in embodiments hot tap assembly 20 comprises valve 21 operatively connected to clamp 10 at or proximate ports 15a,15b (FIG. 2); upper portion 23 connected to a portion of valve 21 distally from clamp 10; lower portion 25 connected to a portion of valve 21 proximate clamp 10 and extendable or otherwise sized to engage pipe 1, where lower portion 25 comprises seal 25a (FIG. 4); and valve interface 22 operatively connected to valve 21. Seal 25a is typically a soft metal gasket which can seal to a machine metal seal.

Figure 5:
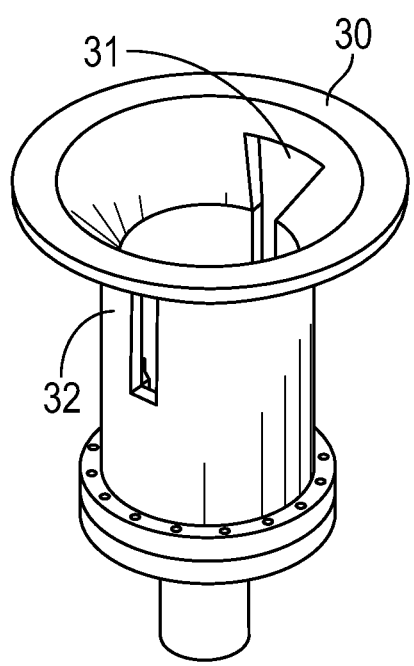
FIG. 5 is a view in partial perspective of a hot tap interface of the exemplary embodiment of a hot tap clamping system of FIG. 1.

Referring additionally to FIG. 5, in embodiments hot tap interface 30 comprises one or more aligners 31 and one or more latch receivers 32. Aligners 31 may be configured such that they act as rough/fine aligners, e.g. having an initial opening which narrows as it progresses towards an opposite end of hot tap interface 30.

Referring back to FIG. 1, support 100 typically comprises actuator 101 operatively in communication with actuator 13. As noted above, support 100 is typically ROV compatible.

Figure 6:
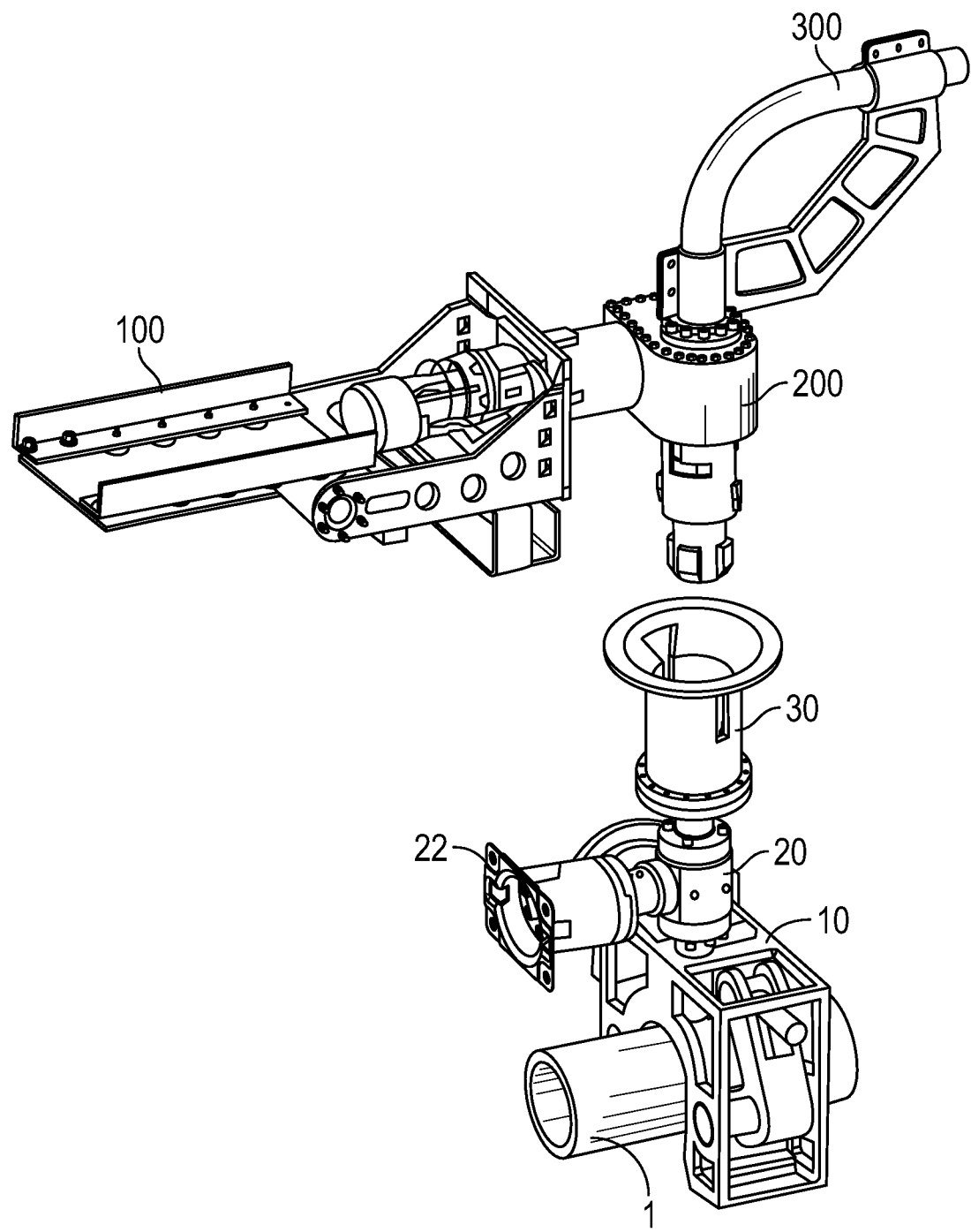
FIG. 6 is a view in partial perspective of a portion of the exemplary embodiment of a hot tap clamping system of FIG. 1.
Figure 7:
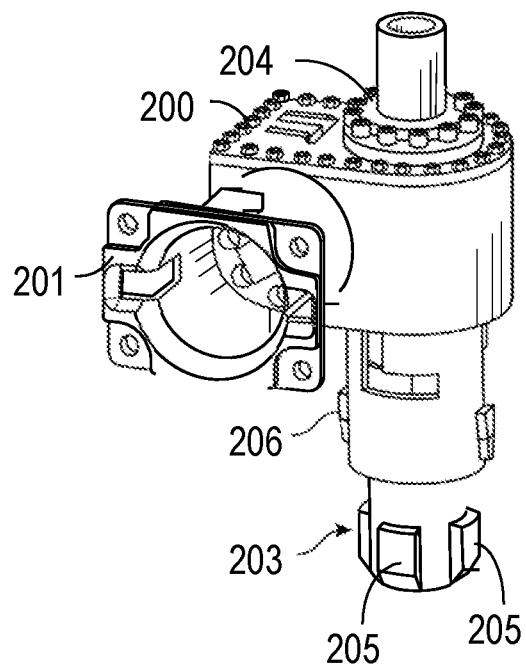
FIG. 7 is a view in partial perspective of a common interface of the exemplary embodiment of a hot tap clamping system of FIG. 1.

Referring now to FIG. 6, in certain embodiments common interface 200 is present and adapted to interface with hot tap interface 30 and provide a connection for different operations such as to machining or coiled tubing 300. Referring additionally to FIG. 7, common interface 200 typically comprises support interface 201 adapted to accept support 100; operations interface 204; and hot tap interface interconnect 203. Hot tap interface interconnect 203 comprises one or more latches 206 configured to be cooperatively received into a corresponding latch receiver 32 and one or more insertion guides 205 configured to be cooperatively received into a corresponding aligner 31.

Figure 8:
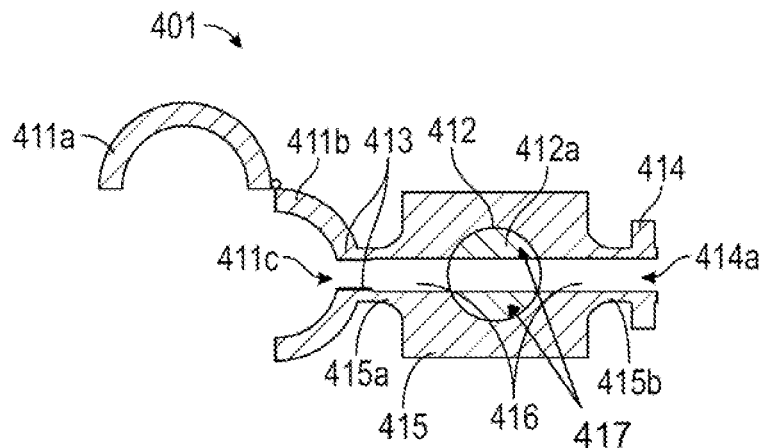
FIG. 8 is top down cutaway view of a sealer of a further exemplary embodiment of a hot tap clamping system.
Figure 9:
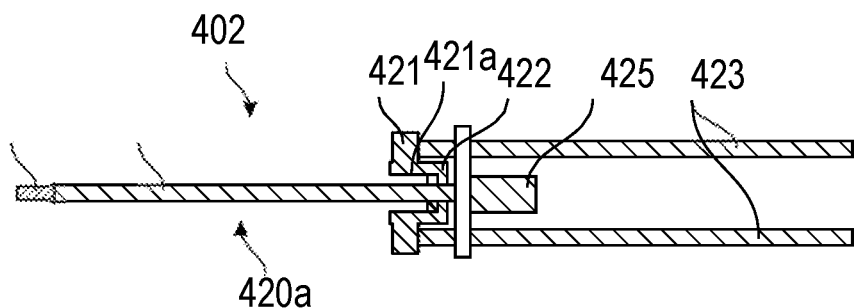
FIG. 9 is top down cutaway view of a hot tap drill/plug running tool of the further exemplary embodiment of the hot tap clamping system of FIG. 8.
Figure 10:
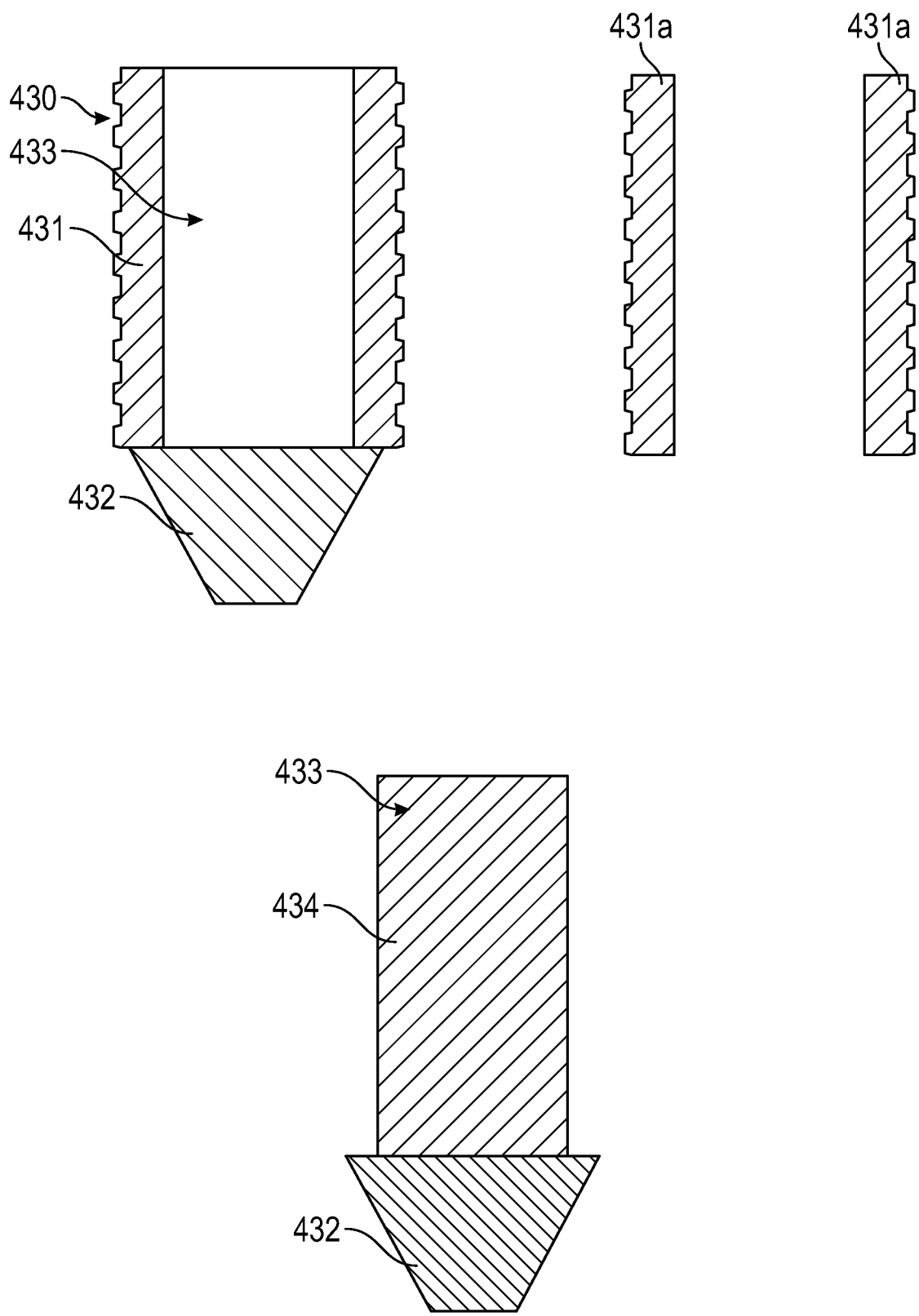
FIG. 10 is cutaway side view of a metal seal plug of the further exemplary embodiment of the hot tap clamping system of FIG. 8.
Figure 11:
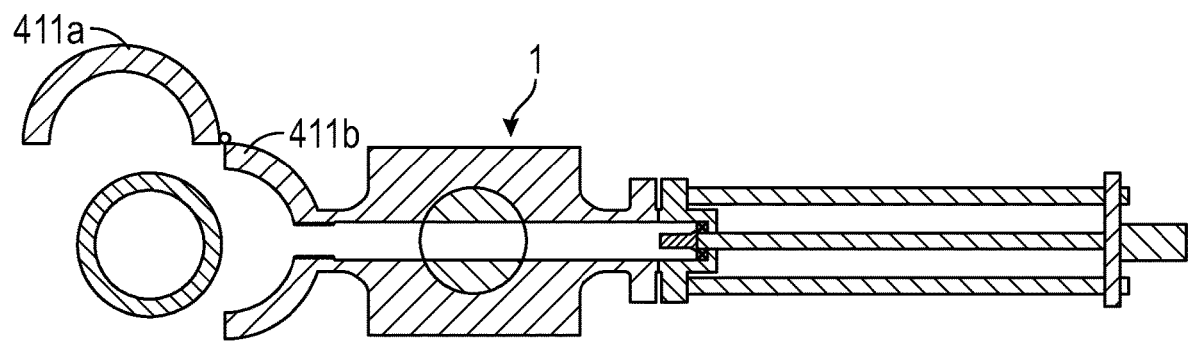
FIGS. 11-17 are cutaway, top down views of the further exemplary embodiment of a hot tap clamping system of FIG. 8 in operation.
Figure 11:
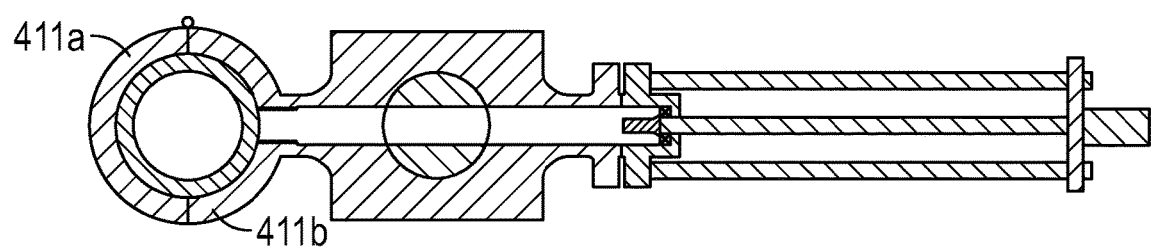
Figure 12:
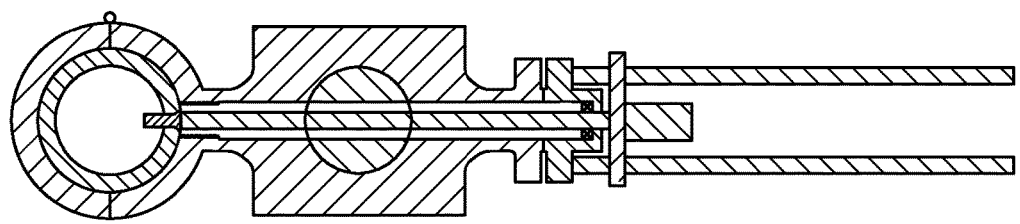
Figure 12:
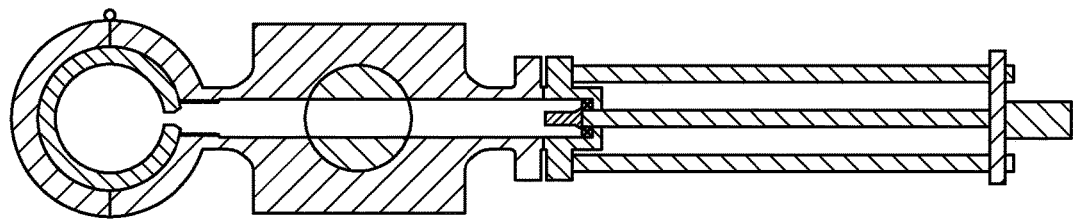
Figure 13:
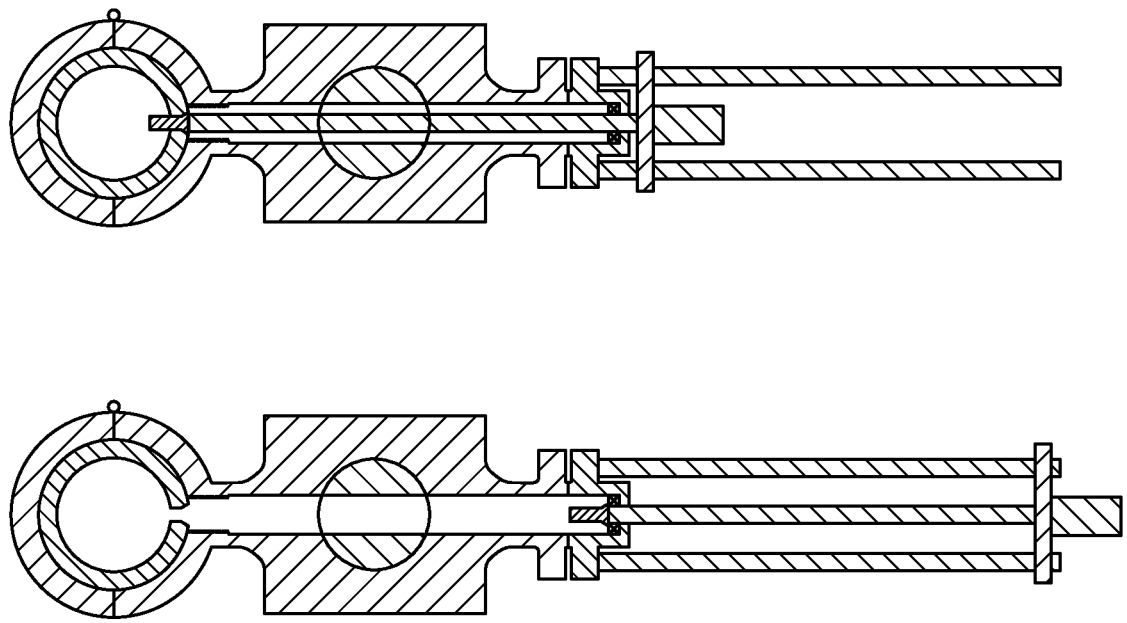
Figure 14:
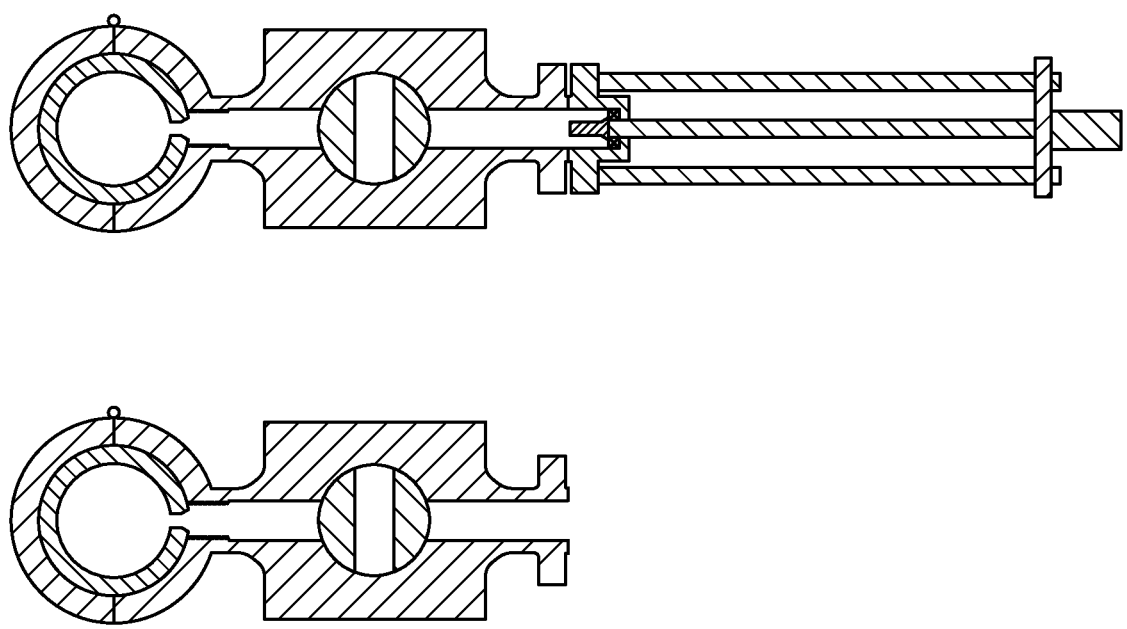
Figure 15:
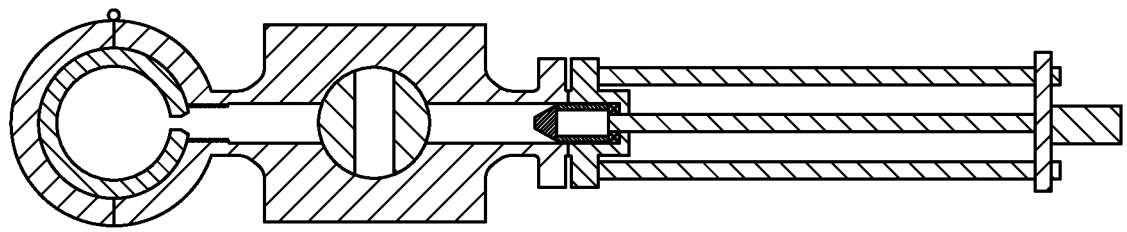
Figure 15:
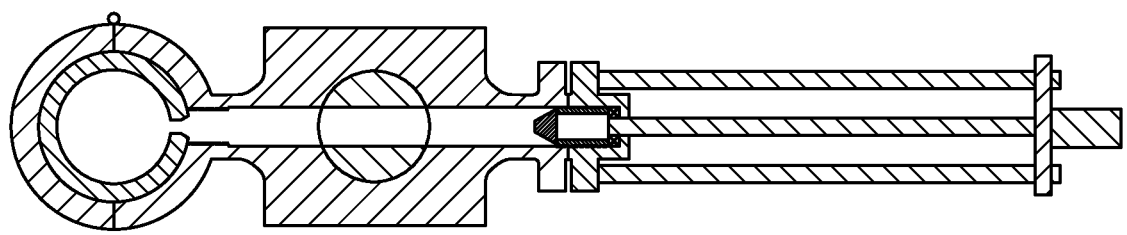
Figure 16:
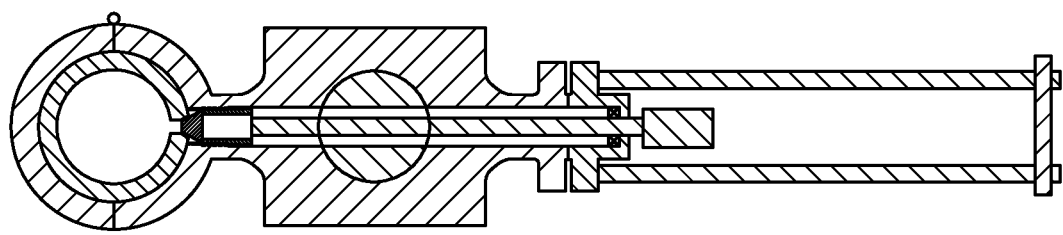
Figure 16:
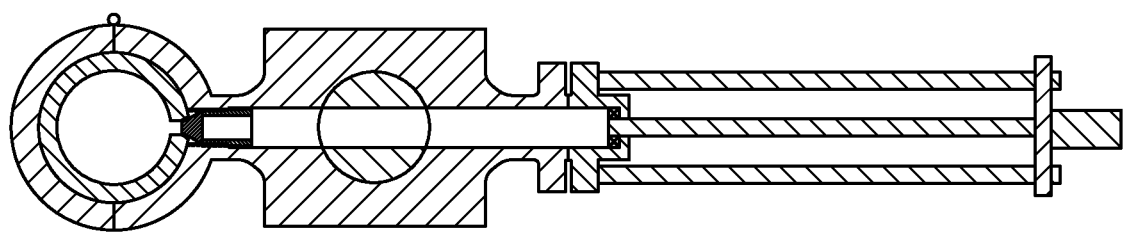
Figure 17:
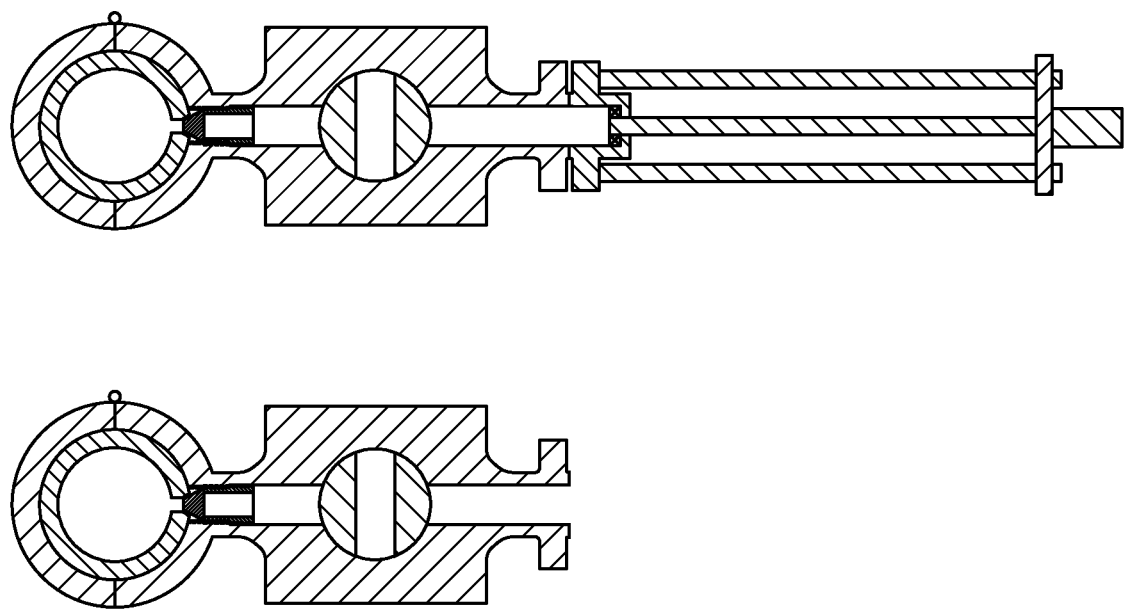

In a further embodiment, referring now to FIGS. 8 through 10, system for sealing a flowline with a metal seal after hot tapping 1000 (FIG. 11) comprises sealer 401, hot tap drill/plug running tool 402 (FIG. 9), and metal seal plug 430 (FIG. 10) which is typically configured for use in sealing a flowline, e.g. pipe 1 (FIG. 1), with a metal seal after hot tapping.

Referring now to FIG. 8, sealer 401 typically comprises sealer body 415, defining inner annulus 416; clamp 411 disposed about first end 415a of sealer body 415; and valve 412 at least partially disposed within inner bore 417 of sealer body 415 where valve 412 comprises inner annulus 412a selectively alignable with inner annulus 416 of sealer body 415 and is adapted to selectively permit or deny fluid continuity between inner annulus 412a of valve 412 and inner annulus 416 of sealer body 415.

Clamp 411 is adapted to provide structural support for metal seal plug 430 (FIG. 10) and comprises first arcuate arm 411a and second arcuate arm 411b. Second arcuate arm 411b is connected to or otherwise part of sealer body 415 and hingedly or pivotally connected to first arcuate arm 411a. Second arcuate arm 411b comprises inner annulus 411c in fluid communication with inner annulus 416 of sealer body 415. Inner annulus 411c of second arcuate arm 411b typically comprises one or more internal threads 413 configured to cooperatively interface with threaded portion 431a (FIG. 10) of rotating collar 431 (FIG. 10).

In these embodiments, sealer connector interface 414 is disposed distally from clamp 411 at second end 415b of sealer body 415 and comprises inner annulus 414a in fluid communication with inner annulus 416 of sealer body 415.

Referring additionally to FIG. 9, hot tap drill/plug running tool 402 comprises connector 421, which comprises inner annulus 421a. Connector 421 is adapted to cooperatively mate with sealer connector interface 414. Hot tap drill/plug running tool 402 further comprises retractable drill shaft 420, comprising first portion 420a extendable through inner annulus 421a of connector 421; feed mechanism 425 operatively connected to retractable drill shaft 420, where feed mechanism 425 may comprise a hydraulic or electric motor operatively connected to a lead screw; one or more seals 422 disposed within connector 421 about retractable drill shaft 420, e.g. proximate inner annulus 421a; and one or more guide rods 423 operatively connected to connector 421.

Referring to FIG. 10, metal seal plug 430 typically comprises rotating collar 431 and substantially tubular portion 433, which is rotatingly disposed within rotating collar 431 and comprises substantially conical sealing surface 432 disposed at a first end portion of substantially tubular portion 433 of metal seal plug 430. Rotating collar 431 is adapted to preload metal seal 430 and comprises outer threaded portion 431a configured to transfer torque provided by a running tool into vertical force to preload metal seal 430. Substantially tubular portion 433 is typically a solid tapered completion plug comprising the same or similar material to that of pipe 1 or a corrosion resistant material, which is adapted to seal against a wall of pipe 1 as opposed to sealing on a neck of a tee in a hot tap fitting.

In the various embodiments, valve 21 (FIG. 1) and/or valve 412 (FIG. 8) typically comprise a ball valve but can comprise a gate valve, a flapper valve, or the like. Moreover, although two clamp arms are illustrated, other configurations may be equivalent, e.g. three clamp arms.

In the operation of exemplary embodiments, and referring generating to FIGS. 11-17, a flowline, e.g. pipe 1 (FIG. 1) may be sealed with a metal seal after hot tapping using the embodiments described above by landing system 1 to a flowline, e.g. pipe 1; disposing clamp 10 (FIG. 1) or clamp 411 (FIG. 8) about a portion of the flowline, e.g. pipe 1; and clamping the system to the flowline using clamp 10 (FIG. 1) or clamp 411 (FIG. 8). In embodiments, after clamping a first pressure test may be performed, typically by using a pressure test port on hot tap drill/plug running tool 402 where the pressure test port can be used by a remotely operated vehicle (ROV) to perform a pressure test and insure system integrity.

If the first pressure test is performed and successful, or if no first pressure test is performed, a drill bit such as drill bit 424 (FIG. 9) may be connected to retractable drill shaft 420 (FIG. 9) and hot tap drill/plug running tool connector 421 (FIG. 9) connected and mated to sealer body connector interface 414 (FIG. 8) such as by using remote operated connector, e.g. a Grayloc™ ROV clamp as manufactured by Oceaneering International, Inc. of Houston, Tex. or other similar connector. If present, guide rods 423 are operatively connected to connector 421 and interface with a motor mounting plate to allow for axial motion. Guide rods 423 may also resist the torque from the motor, e.g. feed mechanism 425.

Valve inner annulus 412a (FIG. 8) is aligned with inner annulus 416 (FIG. 8) of sealer body 415 (FIG. 8) to allow retractable drill shaft 420 (FIG. 9) to advance through inner annulus 416 of sealer body 415 until drill bit 424 engages the flowline and a profile hole drilled. Advancing retractable drill shaft 420 into sealer body annulus 416 until drill bit 424 engages the flowline may comprise advancing drill bit 424 until it reaches a position proximate internal thread 413.

When the profile hole has been successfully drilled, retractable drill shaft 420 may be retracted into hot tap drill/plug running tool 402.

Inner annulus 412a (FIG. 8) of valve 412 (FIG. 8) is aligned with inner annulus 416 (FIG. 8) of sealer body 415 (FIG. 8) to remove fluid continuity between a portion of inner annulus 416 of sealer body 415 on one side of valve 412 and a second portion of inner annulus 416 of sealer body 415 on an opposite side of valve 415. Once aligned, hot tap drill/plug running tool 402 is disconnected from sealer body 415. Drill bit 424 (FIG. 9) may then be disconnected from retractable drill shaft 420 (FIG. 9) after which metal seal plug 430 (FIG. 10) may be connected to retractable drill shaft 420 at the end where drill bit 424 was attached. Typically, at this point a second pressure test is performed, by way of example by using the pressure test port on hot tap drill/plug running tool 402 where the pressure test port can be used by a remotely operated vehicle (ROV) to perform a pressure test and insure system integrity.

If the second pressure test is performed and is successful, or if no second pressure test is performed, hot tap drill/plug running tool 402 may be reconnected and mated to sealer body connector interface 414 (FIG. 8) and inner annulus 412a of valve 412 aligned with inner annulus 416 of sealer body 415 to allow retractable drill shaft 420 to advance through inner annulus 412a of valve 412. Once aligned, retractable drill shaft 420 is advanced into annulus 416 of sealer body 415 and through inner annulus 412a of valve 412 until rotating collar 431 (FIG. 10) engages inner annulus internal thread 413 (FIG. 8) of second arcuate arm 411b (FIG. 8). Threaded portion 431a of rotating collar 431 is then secured into internal thread 413 (FIG. 8) of second arcuate arm 411b after which metal seal plug 430 may be fixedly or removably secured into threaded portion 413. Typically, threaded portion 431a of rotating collar 431 transfers torque provided by hot tap drill/plug running tool 402 into vertical force to preload metal seal plug 430.

Once threaded portion 431a of rotating collar 431 is secured into internal thread 413 of second arcuate arm 411b, retractable drill shaft 410 is retracted into hot tap drill/plug running tool 402.

At this point, a third pressure test may be performed as described above for the first and second pressure tests and, if the third pressure test completes successfully, or if the third pressure test is not performed, valve 412 (FIG. 8) opened and hot tap drill/plug running tool 402 (FIG. 9) disengaged from sealer body 415 (FIG. 8).

As discussed above, each of the pressure tests, if performed, may be performed using a pressure test port on the drilling tool which may be accessed by an ROV's pumping and pressure test equipment.

In certain embodiments, clamp 10 (FIG. 1) or clamp 411 (FIG. 8) seals and valve 412 are only used for pressure containment during tapping operations. In certain embodiments as well, once metal seal plug 430 is set, valve 412 and seals only serve as backup to metal seal plug 430.

As can be understood by one of ordinary skill in these arts, the tapered metal seal plug 430 seals against a wall of pipe 1 rather sealing on a neck of a tee in a hot tap fitting as is taught by the prior art. In addition, one of ordinary skill in these arts will appreciate that clamp 10 or clamp 411, depending on the embodiment, serves as a structural support for metal seal plug 430. In most of the embodiments, the sealer body, e.g. sealer body 415, and the clamp, e.g. clamp 10 or clamp 411, remain attached to pipe 1 after the hot tap operation is completed.

The foregoing disclosure and description of the inventions are illustrative and explanatory. Various changes in the size, shape, and materials, as well as in the details of the illustrative construction and/or an illustrative method may be made without departing from the spirit of the invention.

What is claimed is:

1. A hot tap clamping system, comprising:
   a. a clamp, the clamp comprising:
      i. a substantially cuboid housing, the housing comprising:
         1. a first edge side;
         2. a second edge side disposed opposite of, and substantially parallel to, the first edge side;
         3. an upper side extending between the first edge side and the second edge side, the upper side further comprising a port sized to allow insertion of a hot tap therethrough;
         4. a lower side extending between the first edge side and the second edge side opposite of, and substantially parallel to, the upper side, the lower side comprising a portion sized to fit over and accept a pipe therethroughthe;
         5. a third edge side disposed between the first edge side and the second edge side and extending between the upper side and the lower side and comprising a portion sized to fit over the pipe and accept the pipe therethrough; and
         6. a fourth edge side disposed between the first edge side and the second edge side opposite, and substantially parallel to, the third edge side and extending between the upper side and the lower side and comprising a portion sized to fit over the pipe and accept the pipe therethrough;
      ii. a movable gripper displaced at least partially within the housing, the movable gripper comprising a plurality of gripper arms movable between a first position which allows insertion of the housing about a predetermined portion of the pipe and a second position which secures the housing against the pipe, one portion of the movable gripper comprising a gripper latch;
      iii. an actuator interface connected substantially perpendicularly to an exterior of the cuboid housing other than at the lower side; and
      iv. a first actuator disposed at least partially within the housing and operatively in communication with one of the plurality of gripper arms;
   b. a hot tap assembly connected substantially perpendicularly to the second edge side, comprising:
      i. a valve operatively connected to the clamp proximate the port;
      ii. an upper portion connected to a portion of the valve distally from the clamp;
      iii. a lower portion connected to a portion of the valve proximally from the clamp and extending throughout the port, the lower portion configured to engage the pipe, the lower portion comprising a seal; and
      iv. a valve interface operatively connected to the valve;
   c. a hot tap interface operatively connected to the the upper portion of hot tap assembly and to the valve, the hot tap interface comprising:
      i. an aligner; and
      ii. a latch receiver; and
   d. a support operatively connected to the actuator interface distally from the housing, the support comprising an actuator operatively in communication with the first actuator.

2. The hot tap clamping system of claim 1, further comprising a common interface adapted to interface with the hot tap interface and provide a common standard connection providing a uniform connection interface, the common interface comprising:
   a. a support interface adapted to accept the support;
   b. an operations interface; and
   c. a hot tap interface interconnect, the hot tap interconnect comprising:
      i. a latch configured to be cooperatively received into the latch receiver; and
      ii. an insertion guide configured to be cooperatively received into the aligner and to be secured into the hot tap interface using the latch receiver.

3. The hot tap clamping system of claim 1, wherein the lower portion is configured to engage the pipe by being extendable.

4. The hot tap clamping system of claim 1, wherein the lower portion is configured to engage the pipe by being sized to engage the pipe.

5. The hot tap clamping system of claim 1, wherein the seal comprises a soft metal gasket configured to seal to a machine metal seal.

6. The hot tap clamping system of claim 1, wherein the aligner comprises an annulus having a larger end portion where the annulus inner diameter narrows from the larger end portion as the annulus progresses to its opposite end.

7. The hot tap clamping system of claim 2, wherein the operations interface comprises a machining operation.

8. The hot tap clamping system of claim 2, wherein the operations interface comprises a coiled tubing interface.

9. The hot tap clamping system of claim 2, wherein:
   a. the common interface is substantially tubular; and
   b. the hot tap interface is substantially complimentarily tubular, comprising an inner diameter larger than an outer diameter of the common interface.

* * * * *